US008676922B1

(12) United States Patent
Milner (10) Patent No.: US 8,676,922 B1
(45) Date of Patent: Mar. 18, 2014

(54) AUTOMATIC PROXY SETTING MODIFICATION

(75) Inventor: Marius C. Milner, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 2510 days.

(21) Appl. No.: 10/882,791

(22) Filed: Jun. 30, 2004

(51) Int. Cl.
*G06F 15/16* (2006.01)
*G06F 15/177* (2006.01)

(52) U.S. Cl.
USPC .......................................... 709/217; 709/220

(58) Field of Classification Search
USPC ......... 709/217–219, 202, 203, 225, 229, 232, 709/220; 717/121
See application file for complete search history.

(56) References Cited

U.S. PATENT DOCUMENTS

| | | |
|---|---|---|
| 4,953,106 A | 8/1990 | Gansner et al. |
| 5,450,535 A | 9/1995 | North |
| 5,559,984 A | 9/1996 | Nakano et al. |
| 5,727,129 A | 3/1998 | Barrett et al. |
| 5,748,954 A | 5/1998 | Mauldin |
| 5,752,241 A | 5/1998 | Cohen |
| 5,802,292 A | 9/1998 | Mogul |
| 5,832,494 A | 11/1998 | Egger et al. |
| 5,835,905 A | 11/1998 | Pirolli et al. |
| 5,848,407 A | 12/1998 | Ishikawa et al. |
| 5,878,223 A | 3/1999 | Becker et al. |
| 5,946,697 A | 8/1999 | Shen |
| 5,978,791 A | 11/1999 | Farber et al. ...................... 707/2 |
| 5,978,847 A | 11/1999 | Kisor et al. |
| 6,003,030 A | 12/1999 | Kenner et al. ................... 707/10 |
| 6,014,678 A | 1/2000 | Inoue et al. |
| 6,023,726 A | 2/2000 | Saksena |
| 6,029,175 A | 2/2000 | Chow et al. |
| 6,055,569 A | 4/2000 | O'Brien et al. |
| 6,067,565 A | 5/2000 | Horvitz |
| 6,085,193 A | 7/2000 | Malkin et al. |
| 6,085,226 A | 7/2000 | Horvitz |
| 6,088,707 A | 7/2000 | Bates et al. |
| 6,098,064 A | 8/2000 | Pirolli et al. |
| 6,108,703 A | 8/2000 | Leighton et al. .............. 709/226 |
| 6,128,644 A * | 10/2000 | Nozaki ......................... 709/203 |

(Continued)

FOREIGN PATENT DOCUMENTS

| | | |
|---|---|---|
| EP | 1182589 A2 | 2/2002 |
| GB | 2317723 A | 4/1998 |

(Continued)

OTHER PUBLICATIONS

Arocena, Applications of a Web Query Language, Aug. 12, 1997, 15 pgs.

(Continued)

*Primary Examiner* — Hee Soo Kim
(74) *Attorney, Agent, or Firm* — Morgan, Lewis & Bockius LLP (57) ABSTRACT

The proxy settings for a browser are modified to route public Internet traffic through a local client assistant, while keeping previous proxy policies intact. The process compares the previous proxy results for a known, public Internet address to the previous proxy results for the desired Internet address. If the two proxy results are equivalent, then the request is directed to the local client assistant, otherwise the request is directed according to the previous proxy results. If the testing of the public Internet address had resulted in the use of a proxy, then the local client assistant will route its requests to the proxy so indicated.

9 Claims, 8 Drawing Sheets

(56) References Cited

U.S. PATENT DOCUMENTS

| | | | |
|---|---|---|---|
| 6,128,701 A | 10/2000 | Malcolm et al. | |
| 6,134,551 A | 10/2000 | Aucsmith | |
| 6,134,583 A | 10/2000 | Herriot | |
| 6,167,438 A | 12/2000 | Yates et al. | |
| 6,170,013 B1 | 1/2001 | Murata | |
| 6,178,461 B1 | 1/2001 | Chan et al. | |
| 6,182,122 B1 | 1/2001 | Berstis | |
| 6,182,133 B1 | 1/2001 | Horvitz | |
| 6,195,622 B1 | 2/2001 | Altschuler et al. | |
| 6,205,481 B1 | 3/2001 | Heddaya et al. | |
| 6,230,168 B1 | 5/2001 | Unger et al. | |
| 6,272,534 B1 | 8/2001 | Guha | |
| 6,282,542 B1 | 8/2001 | Carneal et al. | |
| 6,285,999 B1 | 9/2001 | Page | |
| 6,292,880 B1 | 9/2001 | Mattis et al. | |
| 6,317,777 B1 | 11/2001 | Skarbo et al. | |
| 6,338,066 B1 | 1/2002 | Martin et al. | |
| 6,341,311 B1 | 1/2002 | Smith et al. | |
| 6,405,252 B1 | 6/2002 | Gupta et al. | 709/224 |
| 6,421,726 B1 | 7/2002 | Kenner et al. | 709/225 |
| 6,442,549 B1 | 8/2002 | Schneider | |
| 6,484,143 B1 | 11/2002 | Swildens et al. | 705/1 |
| 6,493,702 B1 | 12/2002 | Adar et al. | |
| 6,502,125 B1 | 12/2002 | Kenner et al. | 709/203 |
| 6,516,320 B1 | 2/2003 | Odom et al. | |
| 6,526,479 B2 | 2/2003 | Rosenzweig | |
| 6,532,520 B1 | 3/2003 | Dean et al. | |
| 6,542,964 B1 | 4/2003 | Scharber | |
| 6,553,411 B1 | 4/2003 | Dias et al. | |
| 6,578,113 B2 | 6/2003 | Krishnamurthy et al. | |
| 6,581,090 B1 | 6/2003 | Lindbo et al. | 709/217 |
| 6,584,498 B2 | 6/2003 | Nguyen | |
| 6,611,908 B2 | 8/2003 | Lentz et al. | |
| 6,625,643 B1 | 9/2003 | Colby et al. | 709/217 |
| 6,631,451 B2 | 10/2003 | Glance et al. | |
| 6,638,314 B1 | 10/2003 | Meyerzon et al. | |
| 6,647,421 B1 | 11/2003 | Logue et al. | |
| 6,665,726 B1 | 12/2003 | Leighton et al. | 709/231 |
| 6,701,316 B1 | 3/2004 | Li et al. | |
| 6,725,214 B2 | 4/2004 | Garcia-Chiesa | |
| 6,742,033 B1 | 5/2004 | Smith et al. | |
| 6,744,452 B1 | 6/2004 | McBrearty et al. | |
| 6,745,295 B2 | 6/2004 | Rodriguez | |
| 6,757,733 B2 * | 6/2004 | Gupta | 709/229 |
| 6,766,313 B1 | 7/2004 | Kromann | |
| 6,766,352 B1 | 7/2004 | McBrearty et al. | |
| 6,766,422 B2 | 7/2004 | Beyda | |
| 6,772,225 B1 | 8/2004 | Jennings, III et al. | |
| 6,782,393 B1 | 8/2004 | Balabanovic et al. | |
| 6,813,690 B1 | 11/2004 | Lango et al. | |
| 6,853,391 B2 | 2/2005 | Bates et al. | |
| 6,883,135 B1 | 4/2005 | Obata et al. | |
| 6,912,591 B2 | 6/2005 | Lash | |
| 6,973,457 B1 | 12/2005 | Bastawala et al. | |
| 7,003,566 B2 | 2/2006 | Codella et al. | |
| 7,035,921 B1 | 4/2006 | Baker | |
| 7,051,111 B1 * | 5/2006 | Scullin | 709/232 |
| 7,095,949 B2 | 8/2006 | Okada | |
| 7,100,123 B1 | 8/2006 | Todd et al. | |
| 7,130,872 B2 | 10/2006 | de Bonet | |
| 7,130,890 B1 | 10/2006 | Kumar et al. | |
| 7,155,475 B2 | 12/2006 | Agnoli et al. | |
| 7,185,001 B1 | 2/2007 | Burdick et al. | |
| 7,228,350 B2 | 6/2007 | Hong et al. | |
| 7,249,053 B2 | 7/2007 | Wohlers et al. | |
| 7,328,401 B2 | 2/2008 | Obata et al. | |
| 7,343,397 B2 | 3/2008 | Kochanski | |
| 7,398,271 B1 | 7/2008 | Borkovsky et al. | |
| 7,415,536 B2 | 8/2008 | Nakazawa | |
| 7,426,576 B1 | 9/2008 | Banga et al. | |
| 7,437,364 B1 | 10/2008 | Fredricksen et al. | |
| 7,437,409 B2 | 10/2008 | Danieli | |
| 7,437,725 B1 | 10/2008 | Chang et al. | |
| 7,461,155 B2 | 12/2008 | Reisman | |
| 7,523,181 B2 | 4/2009 | Swildens et al. | |
| 7,548,908 B2 | 6/2009 | Fu et al. | |
| 7,565,425 B2 | 7/2009 | Van Vleet et al. | |
| 7,627,628 B2 | 12/2009 | King et al. | |
| 7,676,576 B1 | 3/2010 | Kommula | |
| 7,725,602 B2 | 5/2010 | Liu et al. | |
| 7,761,594 B1 | 7/2010 | Mowat | |
| 7,836,044 B2 | 11/2010 | Kamvar et al. | |
| 2001/0020248 A1 | 9/2001 | Banga et al. | |
| 2001/0033557 A1 | 10/2001 | Amalfitano | |
| 2001/0050875 A1 | 12/2001 | Kahn et al. | |
| 2002/0002618 A1 | 1/2002 | Vange | |
| 2002/0004813 A1 | 1/2002 | Agrawal et al. | |
| 2002/0007404 A1 | 1/2002 | Vange et al. | |
| 2002/0007413 A1 | 1/2002 | Garcia-Luna-Aceves et al. | |
| 2002/0016786 A1 | 2/2002 | Pitkow et al. | |
| 2002/0023159 A1 | 2/2002 | Vange et al. | |
| 2002/0031102 A1 | 3/2002 | Wiedeman et al. | |
| 2002/0048269 A1 | 4/2002 | Hong et al. | |
| 2002/0078087 A1 | 6/2002 | Stone | |
| 2002/0078371 A1 * | 6/2002 | Heilig et al. | 713/200 |
| 2002/0082811 A1 | 6/2002 | Honjas et al. | |
| 2002/0097261 A1 | 7/2002 | Gottfurcht et al. | |
| 2002/0107935 A1 | 8/2002 | Lowery et al. | |
| 2002/0143892 A1 | 10/2002 | Mogul | |
| 2002/0143984 A1 | 10/2002 | Hudson Michel | |
| 2002/0152361 A1 | 10/2002 | Dean et al. | |
| 2002/0156864 A1 | 10/2002 | Kniest | |
| 2002/0156980 A1 | 10/2002 | Rodriguez | |
| 2002/0161860 A1 | 10/2002 | Godlin et al. | |
| 2002/0184340 A1 | 12/2002 | Srivastava et al. | |
| 2002/0188665 A1 | 12/2002 | Lash | |
| 2002/0191610 A1 | 12/2002 | Baek et al. | |
| 2002/0198883 A1 | 12/2002 | Nishizawa et al. | |
| 2002/0198961 A1 | 12/2002 | Krishnamurthy et al. | |
| 2003/0005152 A1 | 1/2003 | Diwan et al. | |
| 2003/0023813 A1 | 1/2003 | Malcolm | |
| 2003/0046343 A1 | 3/2003 | Krishnamurthy et al. | |
| 2003/0065743 A1 | 4/2003 | Jenny et al. | |
| 2003/0079027 A1 | 4/2003 | Slocombe et al. | |
| 2003/0079041 A1 | 4/2003 | Parrella et al. | |
| 2003/0084159 A1 | 5/2003 | Blewett | |
| 2003/0086098 A1 | 5/2003 | Sesek et al. | |
| 2003/0101234 A1 | 5/2003 | McBrearty et al. | |
| 2003/0158913 A1 | 8/2003 | Agnoli et al. | |
| 2003/0161611 A1 | 8/2003 | Okada | |
| 2003/0167257 A1 | 9/2003 | de Bonet | |
| 2003/0172075 A1 | 9/2003 | Reisman | |
| 2003/0172183 A1 | 9/2003 | Anderson et al. | |
| 2003/0212779 A1 | 11/2003 | Boyter et al. | |
| 2003/0217173 A1 * | 11/2003 | Butt et al. | 709/237 |
| 2004/0039798 A1 | 2/2004 | Hotz et al. | |
| 2004/0049598 A1 | 3/2004 | Tucker et al. | |
| 2004/0064577 A1 | 4/2004 | Dahlin et al. | |
| 2004/0073707 A1 | 4/2004 | Dillon | |
| 2004/0078453 A1 | 4/2004 | Bhogal et al. | |
| 2004/0078487 A1 | 4/2004 | Cernohous et al. | |
| 2004/0107296 A1 | 6/2004 | Donker et al. | |
| 2004/0139282 A1 | 7/2004 | Yoshioka et al. | |
| 2004/0205149 A1 | 10/2004 | Dillon et al. | |
| 2004/0205165 A1 | 10/2004 | Melamed et al. | |
| 2004/0215665 A1 | 10/2004 | Edgar et al. | |
| 2004/0225644 A1 | 11/2004 | Squillante et al. | |
| 2004/0230747 A1 | 11/2004 | Ims et al. | |
| 2004/0237044 A1 | 11/2004 | Travieso et al. | |
| 2004/0239681 A1 | 12/2004 | Robotham et al. | |
| 2004/0249971 A1 | 12/2004 | Klinker | |
| 2004/0250119 A1 | 12/2004 | Shelest et al. | |
| 2004/0260466 A1 | 12/2004 | Ichihara et al. | |
| 2004/0262051 A1 | 12/2004 | Carro | |
| 2005/0033803 A1 | 2/2005 | Vleet et al. | |
| 2005/0038787 A1 | 2/2005 | Cheung et al. | |
| 2005/0138604 A1 * | 6/2005 | Harrison | 717/121 |
| 2005/0165778 A1 | 7/2005 | Obata et al. | |
| 2005/0165829 A1 | 7/2005 | Varasano | |
| 2005/0198224 A1 | 9/2005 | Kobayashi et al. | |
| 2005/0198327 A1 | 9/2005 | Iwamura et al. | |
| 2005/0198386 A1 | 9/2005 | Accapadi et al. | |
| 2005/0204064 A1 | 9/2005 | Ruiz | |
| 2005/0246347 A1 | 11/2005 | Kobayashi | |

(56) References Cited

U.S. PATENT DOCUMENTS

| | | |
|---|---|---|
| 2005/0278222 A1 | 12/2005 | Nortrup |
| 2005/0278417 A1 | 12/2005 | Fremantle et al. |
| 2006/0047804 A1 | 3/2006 | Fredricksen et al. |
| 2006/0085601 A1 | 4/2006 | Woffinden et al. |
| 2006/0089978 A1 | 4/2006 | Lee et al. |
| 2006/0143568 A1 | 6/2006 | Milener et al. |
| 2006/0156387 A1 | 7/2006 | Eriksen |
| 2006/0167862 A1 | 7/2006 | Reisman |
| 2006/0168348 A1 | 7/2006 | Casalaina |
| 2006/0179123 A1 | 8/2006 | Smith |
| 2006/0253612 A1 | 11/2006 | Cheshire |
| 2006/0271642 A1 | 11/2006 | Stavrakos et al. |
| 2006/0294223 A1 | 12/2006 | Glasgow et al. |
| 2006/0294311 A1 | 12/2006 | Fu et al. |
| 2007/0022102 A1 | 1/2007 | Saxena |
| 2007/0174774 A1 | 7/2007 | Lerman et al. |
| 2007/0189708 A1 | 8/2007 | Lerman et al. |
| 2007/0214052 A1 | 9/2007 | Kao |
| 2007/0250841 A1 | 10/2007 | Scahill et al. |
| 2007/0294480 A1 | 12/2007 | Moser |
| 2008/0010365 A1 | 1/2008 | Schneider |
| 2008/0140626 A1 | 6/2008 | Wilson |
| 2008/0195819 A1 | 8/2008 | Dumont |
| 2008/0222363 A1 | 9/2008 | Khemani et al. |
| 2008/0229017 A1 | 9/2008 | Plamondon |
| 2009/0049388 A1 | 2/2009 | Taib et al. |
| 2009/0119286 A1 | 5/2009 | Reisman |
| 2009/0276407 A1 | 11/2009 | Van Vleet et al. |
| 2010/0257236 A1 | 10/2010 | Agnoli et al. |

FOREIGN PATENT DOCUMENTS

| | | | |
|---|---|---|---|
| WO | WO 01/55897 A1 | 8/2001 | |
| WO | WO 02/100117 A2 | 12/2002 | |
| WO | WO 2005/006129 A2 | 1/2005 | |

OTHER PUBLICATIONS

Banga, Optimistic Deltas for WWW Latency Reduction, 1997, 15 pgs.
Bestavros, Server-initiated Document Dissemination for the WWW, Sep. 3-11, 1996, 8 pgs.
Botafogo, Structural Analysis of Hypertext: Identifying Hierarchies and Useful Metrics, Apr. 1992, 39 pgs.
Boyle, To link or not to link: An empirical comparison of hypertext linking strategies, 1992, 11 pgs.
Bruck, Weighted Bloom Filter, Information Theory, Jul. 9-14, 2006, 5 pgs.
Cao, A Study of Integrated Prefetching and Caching Strategies, Jun. 1995, 10 pgs.
Carriere, WebQuery: Searching and Visualizing the Web through Connectivity, 1997, 12 pgs.
Chan, Cache-based Compaction: A New Technique for Optimizing Web Transfer, 1999, 9 pgs.
Cohen, Proactive Caching of DNS Records: Addressing a Performance Bottleneck, SAINT, Jan. 2001, 10 pgs.
Craswell, Effective Site Finding using Link Anchor Information, Sep. 9-12, 2001, 8 pgs.
Curewitz, Practical Prefetching via Data Compression, 1993, 10 pgs.
Doreian, A Measure of Standing for Citation Networks within a Wider Environment, 1994, 11 pgs.
Doreian, Measuring the Relative Standing of Disciplinary Journals, 1998, 12 pgs.
Douglis, Dynamic Suppression of Similarity in the Web: a Case for Deployable Detection Mechanisms, Jul. 11, 2002, 8 pgs.
Fan, Web Prefetching Between Low-Bandwidth Clients and Proxies: Potential and Performance, May 1999, 13 pgs.
Frisse, Searching for Information in a Hypertext Medical Handbook, Jul. 1998, 7 pgs.
Garfield, Citation Analysis as a Tool in Journal Evaluation, 1962-1973, 18 pgs.
Geller, On the Citation Influence Methodology of Pinski and Narin, 1978, 3 pgs.
Gong, Bloom Filter-based XML Packets Filtering for Millions of Path Queries, 2005, 12 pgs.
Google Inc., ISR, PCT/US2005/022067, Oct. 1, 2006, 7 pgs.
Google Inc., ISR/WO, PCT/US2008/054167, Jul. 2, 2008, 8 pgs.
Google Inc., ISRWO, PCT/US2008/088047, Feb. 23, 2009, 8 pgs.
Griffioen, Reducing File System Latency Using a Predictive Approach, Jun. 1994, 12 pgs.
Gwertzman, The Case for Geographical Push-Caching, 1995, 5 pgs.
Henzinger, Measuring Index Quality Using Random Walks on the Web, May 1999, 35 pgs.
Hubbell, An Input-Output Approach to Clique Identification Sociometry, 1965, 23 pgs.
Katz, A New Status Index Derived from Sociometric Analysis, Mar. 1953, 5 pgs.
Kimbrel, Integrated Parallel Prefetching and Caching, 1996, 2 pgs.
Kleinberg, Authoritative Sources in a Hyperlinked Environment, Sep. 1999, 29 pgs.
Kroeger, Digital's Web Proxy Traces, Dec. 1996, 5 pgs.
Luotonen, World-Wide Web Proxies, Apr. 994, 8 pgs.
Marchiori, The Quest for Correct Information on the Web: Hyper Search Engines, 1997, 18 pgs.
Markatos, A Top-10 Approach to Prefetching on the Web, Aug. 1996, 15 pgs.
McBryan, GENVL and WWWW: Tools for Taming the Web, May 1994, 10 pgs.
Mizruchi, Techniques for Disaggregating Centrality Scores in Social Networks, 1996, 23 pgs.
Mogul, Delta Encoding in HTTP, Jan. 2002, 49 pgs.
Mogul, Potential Benefits of Delta Encoding and Data Compression for HTTP, 1997, 14 pgs.
Padmanabhan, Using Predictive Prefetching to Improve World Wide Web Latency, Jul. 1996, 15 pgs.
Palmer, Fido: A Cache That Learns to Fetch, Sep. 1991, 10 pgs.
Patterson, Informed Prefetching and Caching, May 11, 1995, 24 pgs.
Pinski, Citation Influence for Journal Aggregates of Scientific Publications: Theory with Application to the Literature of Physics, 1976, 16 pgs.
Ramer, Similarity, Probability and Database Organization: Extended Abstract, 1996, 6 pgs.
Rhea, Value-based Web Caching, May 2003, 10 pgs.
Sakaguchi, A Browsing Tool for Multi-lingual Documents for Users without Multi-lingual Fonts, 1996, 7 pgs.
Schilit, TeleWeb: Loosely Connected Access to the World Wide Web, May 6-10, 1996, 16 pgs.
Tait, Detection and Exploitation of File Working Sets, May 1991, 19 pgs.
Vitter, Optimal Prefetching via Data Compression, Nov. 13, 1995, 20 pgs.
Wang, Prefetching in World Wide Web, 1996, 5 pgs.
Williams, Removal Policies in Network Caches for World-Wide Web Documents, Aug. 1996, 14 pgs.

* cited by examiner

Prior Art

AUTOMATIC PROXY SETTING MODIFICATION

TECHNICAL FIELD

The present invention relates generally to the configuration of Internet browser settings for use in computer network systems, and in particular to automatically modifying browser settings.

RELATED APPLICATIONS

This application is related to U.S. patent application Ser. No. 10/882,794, filed Jun. 30, 2004, "System and Method of Accessing a Document Efficiently Through Multi-Tier Web Caching", which is hereby incorporated by reference in its entirety.

BACKGROUND

Computer networks may take a variety of forms. They may be located within a small, local geographic area, such as an office building, and consist of only a limited number of devices. This type of network is commonly referred to as a Local Area Network (LAN). On a broader scale, the networks may be larger and support more users over a wider geographic area, such as across a city or state. This type of network is commonly referred to as a Wide Area Network (WAN). On an even broader scale the LAN and WAN networks may be interconnected across a country or globally. An example of a globally connected public data communications network is the Internet. LANs and WANs are more likely to be private networks, that is, those which do not allow access by non-permitted computing devices.

Devices which may be associated with these networks may include personal computers, cellular phones, mobile data terminals, radio modems, portable computers, personal digital assistants, pagers, mainframes, departmental servers, mass storage devices, or any other similar device. A browser is a software program designed to help a user access information stored locally or on networks.

A proxy is a device or mechanism (usually an application program) on a network node which performs specialized functions and typically sits between the user's device and a network. One such function is to provide network security. Security is provided between a private and public network by requiring communications (e.g., information exchanges) to pass through the proxy. Another function of a proxy is to store or cache recently accessed information (e.g., copies of documents and images). If a browser desires information which is located outside the local network, that is to say on an information source attached to an external network, communications pass from the browser through the proxy before going on to the external network.

SUMMARY

In accordance with one embodiment of the invention, a method is disclosed for determining a proxy. A first proxy is determined for a predetermined host as well as a second proxy for a desired host. The resulting proxy is the first proxy if the first and second proxies are equivalent and is the second proxy if the first and second proxies are not equivalent.

In accordance with another embodiment of the invention, a method for creating a modified proxy setting for a browser includes inputting a current proxy setting. A first computer programming object is created for determining a first proxy for a predetermined host using the current proxy setting. A second computer programming object is created for determining a second proxy for a desired host using the current proxy setting. A third computer program object is created for returning a predetermined proxy as a proxy if the first proxy and the second proxy are equivalent, and otherwise returning the second proxy as the proxy. A fourth computer program object is created by including at least the first computer programming object and the second computer programming object into a computer program object.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

DESCRIPTION OF EMBODIMENTS

Figure 1:
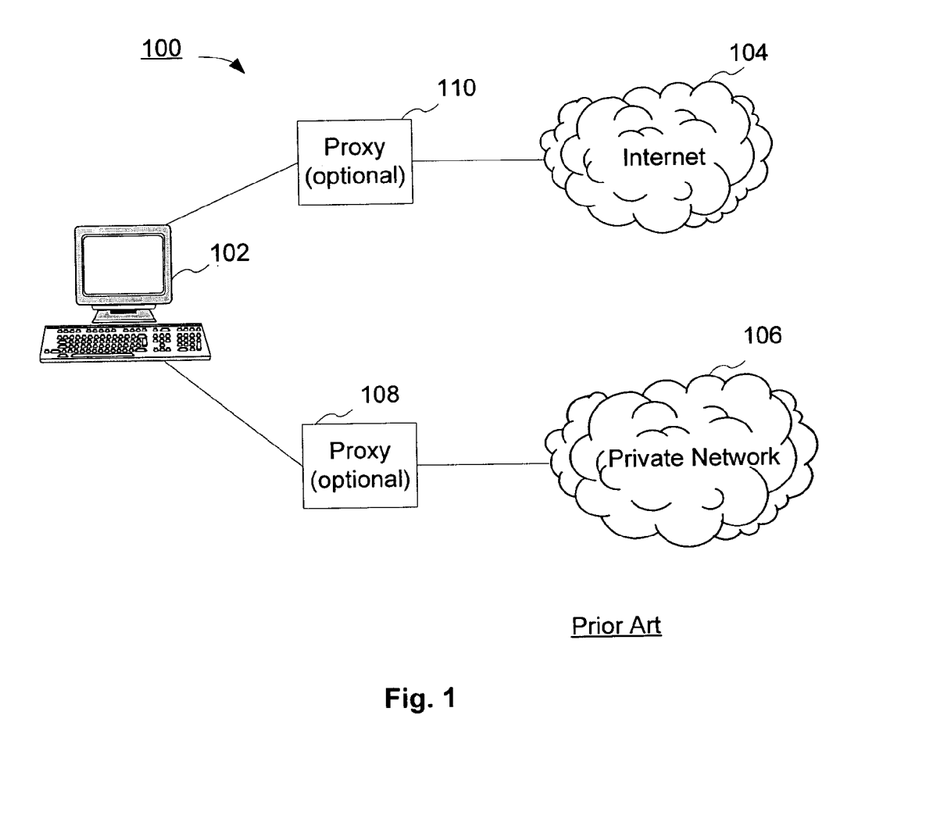
FIG. 1 illustrates a connectivity environment.

FIG. 1 illustrates an environment 100 in which a computer may be connected to one or more networks. For example, a client 102 can be connected to the Internet 104 or a private network 106, or both. Optionally, a proxy 108 may be located between the client 102 and the private network 106. Likewise, the client 102 can be connected to the Internet 104 via a proxy 110. The proxies 108 and 110, when used, act as gatekeepers which may be used for a number of different purposes as described earlier.

The client 102 can be any number of different types of client devices, such as a personal computer, a cellular phone, a mobile data terminal, a radio modem, a portable computer, a personal digital assistant, or another type of device that can be used to obtain information from networks. Proxy 110 or 108 can be an application running on the client 102, an application running on a server remote from the client 102 in the network, or a specialized server.

The private network 106 may include of any number of different types of networks including local area networks, wide area networks, and other types of networks within companies or localities or other networks where access is limited or controlled (e.g., a company intranet). The private network 106 is typically defined by a set IP addresses (internet protocol addresses) which are designed to be within certain geographical or logical groupings, but more importantly, not considered to be part of the public internet, such as Internet 104. For example, a company may place its servers and clients on a private network which is isolated from the public.

A user will typically use a browser (not shown) or other application to access a particular resource on the private network 106 or the Internet 104. The user enters a uniform resource locator (URL) into the browser and then the browser attempts to locate the resource. The URL consists of a number of elements, including, for example, a protocol, a hostname and a resource location. Other elements might include a port number or authorization information. The hostname is the name of the server on which the desired resource is located. The hostname may be represented as a domain address, i.e., series of digits such as 216.239.36.10, or by a domain name, such as www.google.com, which must ultimately be translated using a domain name system (DNS) server into a domain address. RFCs 1480 and 1591 promulgated by the Internet Engineering Task Force (IETF) provide more information about domain naming and RFC 1738 addresses URLs. Based on the hostname, the browser determines whether the client 102 will send the request directly to a particular network or to a proxy. As mentioned above, proxies are typically used to provide services such as document caching, DNS caching, security, and/or enforcement of local policies.

In certain situations, an application running on a client may need to communicate with an application on a server. This may be particularly useful for providing services between a client and a network such as the Internet. For example, a system and method for providing accelerated delivery of documents to a client from a network is described in application Ser. No. 10/882,794, System and Method of Accessing a Document Efficiently Through Multi-Tier Web Caching", filed Jun. 30, 2004, which is hereby incorporated by reference. In such a system and method, a local client assistant is paired with a server application to assist in the delivery of documents. In this context, the term "document" is used broadly and includes files and data structures of many types, including text documents, images, audio, multimedia files, data steams, and so on. Other types of services could be imagined and still fall within the scope of embodiments of the present invention.

Figure 2:
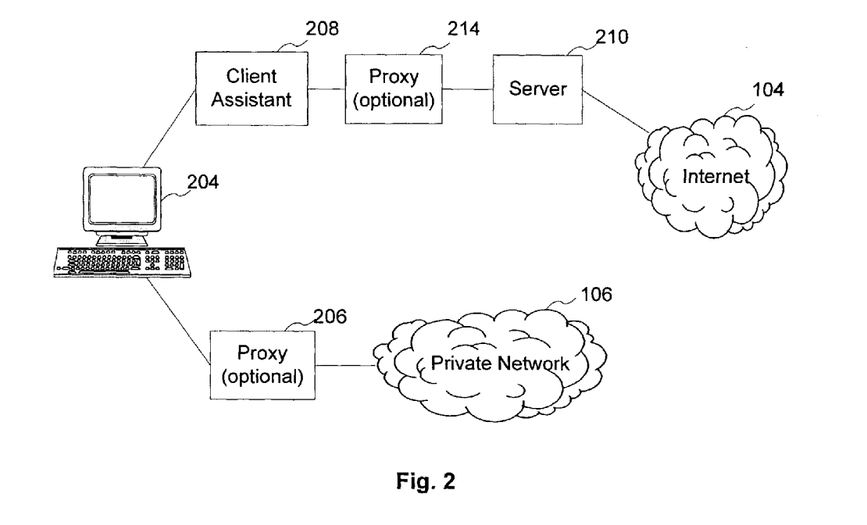
FIG. 2 illustrates a connectivity environment in which an embodiment of the present invention may operate.

FIG. 2 illustrates how a client assistant and server application can be used in conjunction with a client's connections to one or more networks according to an embodiment of the invention. Private network 106 is connected to a client 204 via a proxy 206. Alternatively, the client 204 can be connected to the private network 106 without the use of the proxy 206. A client assistant 208 is resident on client 204 and acts as an interface between the client 204 and a server 210, which in turn provides an interface to resources on the Internet 104. Optionally, a proxy 214 may be logically or physically located between the client assistant 208 and the server 210. In order to take advantage of the services provided by the combination of client assistant 208 and server 210, the proxy settings of the client 204 must be modified, yet still taken into account. This helps to ensure that the current use of proxies and network configurations will not be adversely affected or circumvented.

The term "located" is used here and elsewhere and should be understood to apply to locations which may be physical or logical. For example, proxies may be local software applications running on the client, stand alone hardware/software combinations, or applications running on a server remote from the client. One of ordinary skill in the art will recognize various ways to achieve desired proxy features.

A client computer may be configured to operate within various types of connectivity situations, the features of which must be addressed when configuring the client computer to work with the client assistant/server combination described above. FIGS. 3-6 are illustrative of some of these connectivity situations. Persons of ordinary skill in the art will recognize that the principles laid out herein are naturally extended and applied to variations and permutations of the connectivity examples illustrated herein.

FIGS. 3 through 6 show network configurations before and after the addition of a client assistant/server combination to the system. For each of these network configurations, original proxy settings and revised proxy settings are discussed. The revised proxy settings are used to route Internet traffic through a client assistant/server combination while preserving the routings associated with the original proxy settings.

Figure 3:
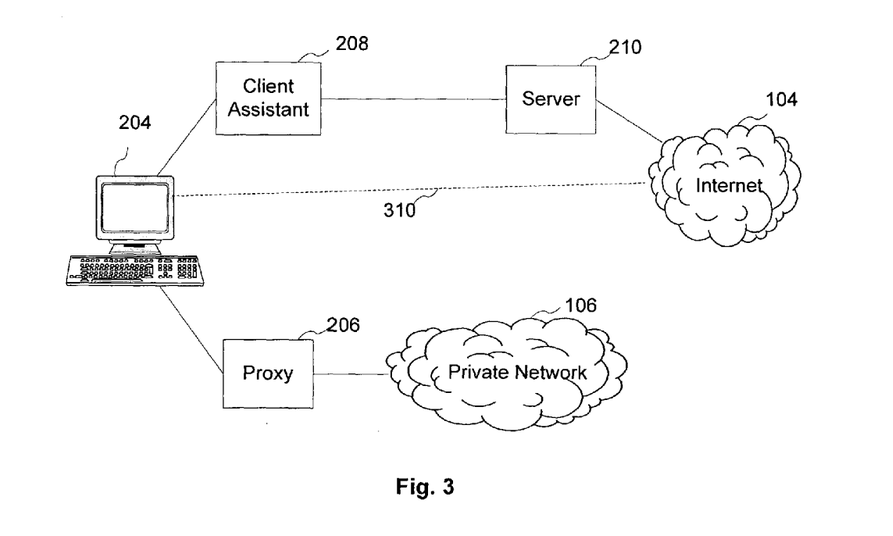
FIG. 3 illustrates another connectivity environment in which an embodiment of the present invention may operate.

FIG. 3 illustrates one possible scenario in which the client assistant/server combination could be used. As described above, the services provided by the client assistant/server combination may be utilized when the client assistant and server are located between the client computer device and the Internet. As illustrated in FIG. 3, the client computer 204 is connected to a proxy 206 which, in turn, is connected to the private network 106. The client 204 is also connected to the Internet 104 directly (i.e., without an intervening proxy) as noted by the dashed line 310. In this network configuration, all requests and connections to the private network 106 are routed through the proxy 206. As mentioned before, this may be done for a number of reasons including policy enforcement, security; or caching, to name a few.

When a URL request is processed by the browser on the client 204, the browser will examine the URL to determine whether the address of the host in the request is within the private network 106. This might occur, for example, under control of code within, or accessed by, the browser. The browser determines whether the protocol address is within the private network, and, if it is within the private network, sends those requests to the proxy 206. On the other hand, if the address is determined not to be within the private network, then the request is sent directly to the Internet 104 via the dotted line connection 310. In such an instance, it would be desirable to replace the direct connection 310 with connections that would cause Internet requests that previously would have gone directly to the Internet 104 to be routed to client assistant 208 which would, in turn, direct the requests to server 210. This can be done, for example, by configuring the browser to recognize the client assistant 208 as a local proxy for requests directed to the Internet 104. The combination of client assistant 208 and server 210 can provide enhanced connection services between the client 204 and the Internet 104. For example, client assistant 208 and server 210 could provide enhanced caching and document delivery, thereby decreasing the time from when a user requests a document until user sees or is presented with the document. Although described here and elsewhere using a browser as an exemplary application, one of the ordinary skill in the art will recognize that the concepts employed in the embodiments described herein would apply equally well to other type of applications used to access network resources.

In this connectivity example, the browser configuration should be modified to recognize the client assistant 208 as a local proxy for connections directed to the Internet 104. However, the original proxy settings for addresses within the private network 106, which cause requests directed to those addresses to be sent through proxy 206, should remain unchanged. Altering the original proxy configuration for the private network 106 might have adverse consequences for security, policy enforcement, caching or other features associated with the private network 106.

Figure 4:
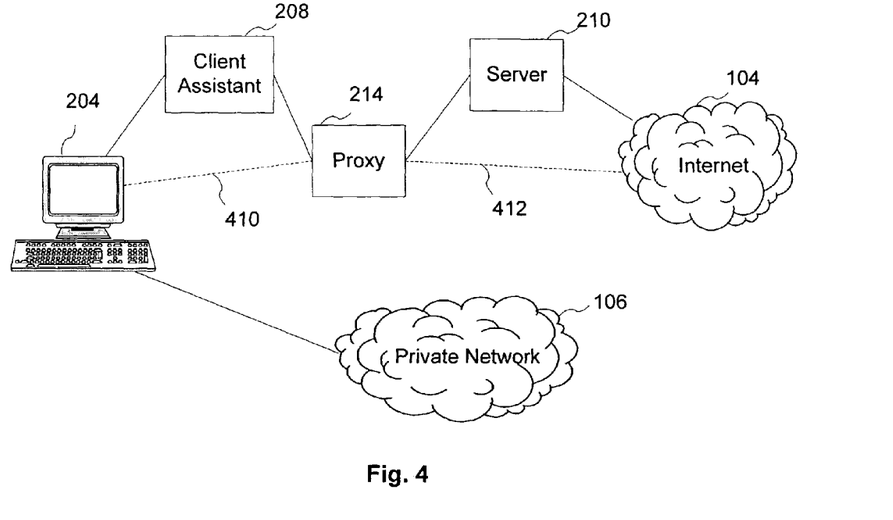
FIG. 4 illustrates yet another connectivity environment in which an embodiment of the present invention may operate.

FIG. 4 illustrates a second connectivity example in which a client assistant/server combination could be used to enhance the user's experience. In this example, the client 204 is connected directly to the private network 106. Unlike the previous example in FIG. 3, there is no proxy between the client and the private network. On the other hand, a proxy 214 is used between the client 208 and the Internet 104 as illustrated by the dotted line 410 between client 208 and the proxy 214 and the dotted line 412 between the proxy 214 and the Internet 104. In this example, it is desirable to maintain the logical positioning of the proxy 214 between the client 204 and the Internet 104 when adding the client assistant 208 and the server 210. This proxy 214 may provide various services, including, but not limited to, firewall protection, filtering services, or such services utilized by local administrators for managing network traffic to those Internet protocol addresses which are not recognized as belonging to private network 106. Accordingly, the client computer's revised proxy settings should route requests to such addresses through the proxy 214. This can be achieved by modifying the proxy settings of the browser to point to the client assistant 208 if the address is not recognized as being located in the private network 106. Those addresses which are recognized as being within the private network 106 are forwarded directly to the private network 106. The client assistant 208, in turn, is configured to direct its communications with the server 210 through the proxy 214. The proxy 214, using the IP address created by the client assistant 208, would then direct the requests to the server 210 while applying is processing features. In this way, the policies and services provided by proxy 214 are maintained even with the addition of the client assistant 208 and the server 210.

Figure 5:
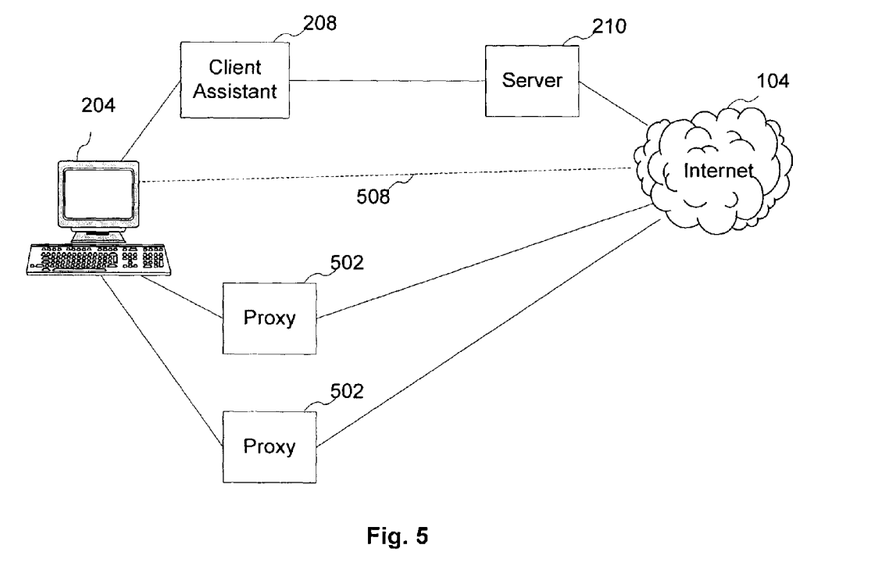
FIG. 5 illustrates still another connectivity environment in which an embodiment of the present invention may operate.

FIG. 5 shows yet another connectivity environment in which the client assistant/server combination could be utilized. In this example, a number of proxies 502 are located between the client 208 and the Internet 104. A particular proxy 502 might provide additional and more specific features associated with particular topics or areas of research. For example, one proxy 502 might be used with Internet addresses associated with medical web sites and another might be for legal web sites, while still another might be used with research and development web sites. These proxies 502 can take advantage of the frequent and specialized searching accomplished within those desired areas. For example, in the case of a proxy 502 used for addresses associated with medical sites, the likelihood that a medical-related document might be present in a cache of the proxy 502 would be higher than if the request was sent though a proxy handling all, or different, types of Internet sites. These proxies 502 could also be used for a variety of other reasons such as providing local caching of data that is accessed frequently or by many users. Moreover, these proxies 502 could be used in general browsing and for mirroring copies of certain websites. The IP addresses which are not recognized as belonging to a specific proxy 502 would be directly routed to the Internet 104 via the dotted line 508. In this example, it is desirable to replace the direct connection 508 with a connection from client 204 to client assistant 208, with subsequent connection to server 210. The server 210 is connected between the client assistant 208 and the Internet 104. In this example, so as not to lose the benefits provided by proxies 502, requests directed by the original browser proxy settings to proxies 502 should continue to be handled by proxies 502. This may be achieved by, for example, modifying the browser's proxy settings to send all requests not otherwise handled by any of the proxies 502 to the client assistant 208. The client assistant would send the requests to server 210 as needed.

Figure 6:
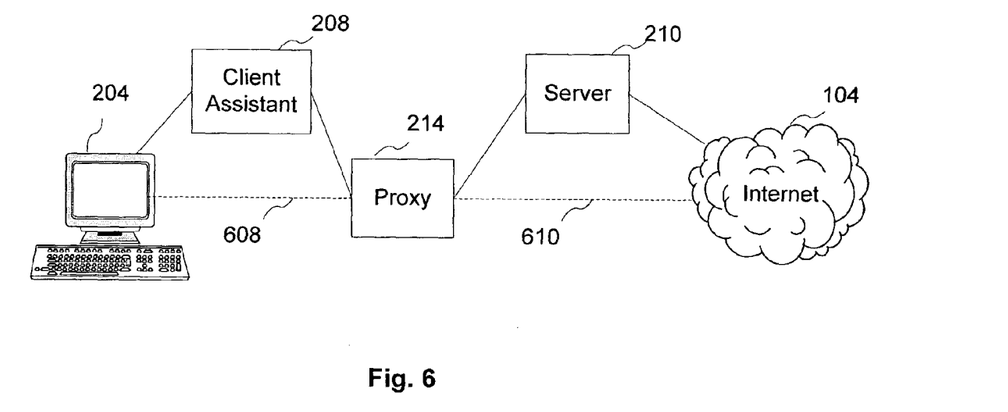
FIG. 6 illustrates still another connectivity environment in which an embodiment of the present invention may operate.

FIG. 6 illustrates yet another connectivity environment. In this environment, in accordance with the original set of proxy settings, the client 204 is connected to the Internet 104 via the proxy 214 as illustrated via the dotted line connection 608 between the client 204 and the proxy 214 and the dotted line connection 610 between the proxy 214 and the Internet 104. In this situation it is desirable to maintain the proxy 214 between the client 204 and the Internet 104. This example, might be representative of an Internet service provider-type connection where all Internet requests are routed through a proxy, via, for example, dial-up or broadband connection. Persons of ordinary skill in the art would recognize other situations where all Internet traffic is routed through a proxy 214. As before, to retain the services provided by the proxy 214, the local browser proxy settings should be modified to direct all traffic to the client assistant 208 which in turn directs its traffic to the proxy 214. The proxy 214 will then direct the traffic, not through the dotted line connection 610 to the Internet 104, but to server 210 as a result of addressing by client assistant 208.

In some embodiments, when the proxy 214 is determined to be a local proxy, modified proxy settings are not generated. As a result, the services provided by the client assistant/server combination are not available to the client computer 204. In yet other embodiments, when a local proxy 214 is determined to meet predefined criteria, the user's browser configuration is left intact and the local proxy is modified to send its requests to the client assistant 208, which in turn sends the requests to the server 210. However, this embodiment requires knowledge of the local proxy's configuration and the ability to modify it, neither of which are always available.

Placing the client assistant/server combination in the connectivity environments described above according to embodiments of the invention can be accomplished with the following realization: that the browser should route the private network traffic and traffic for specialized proxies as it had before, but otherwise send the traffic to the client assistant. In addition, the client assistant will be configured to route other traffic through the existing, general proxy, if one existed. Otherwise, the client assistant is configured to send the "other traffic" directly to the server paired with the client assistant. In other embodiments, there is not necessarily a direct pairing between client assistants and servers and the client assistant might connect to other servers which still allow the client assistant/server combination to achieve the desired effects.

Figure 7:
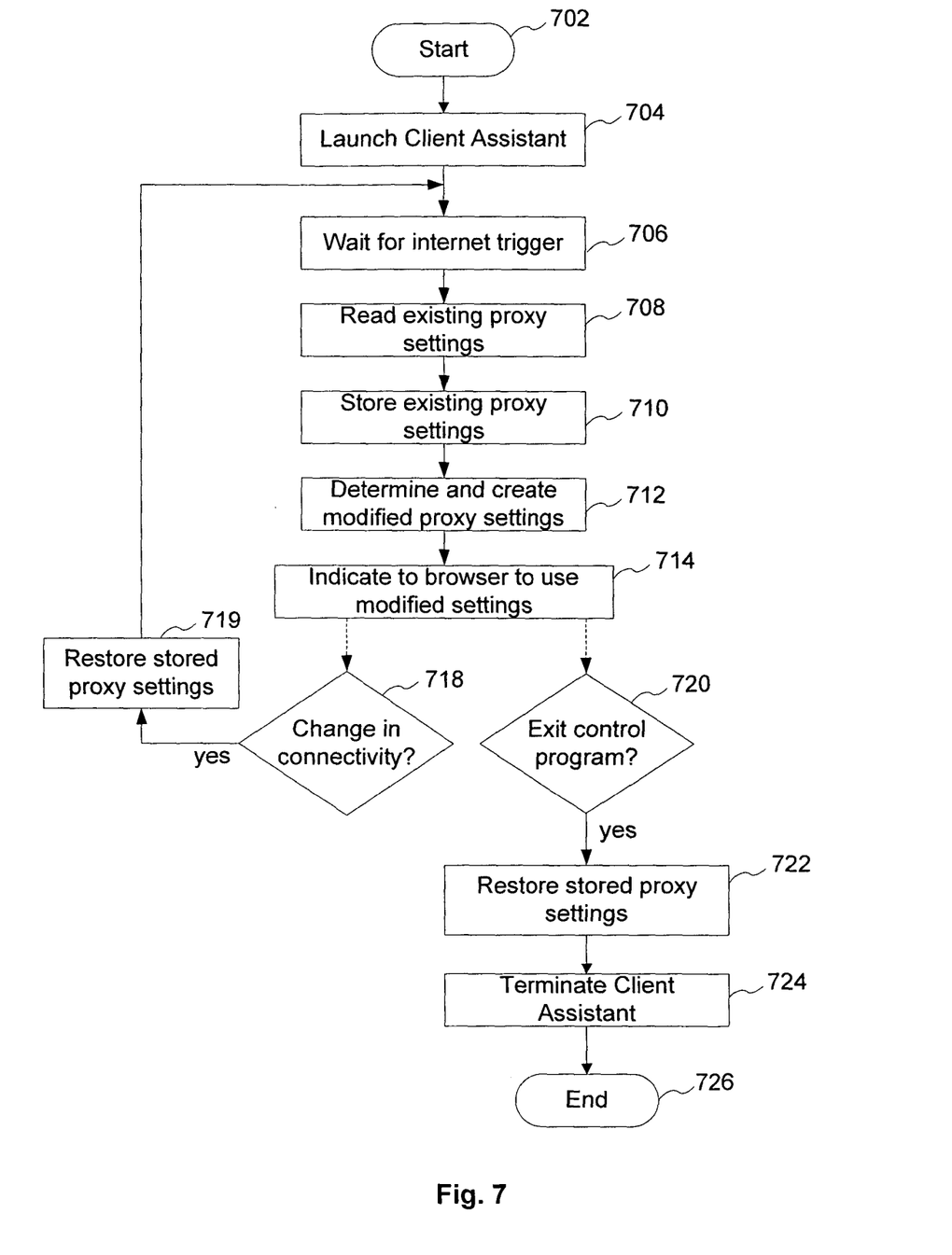
FIG. 7 illustrates a flow chart for a control program according to an embodiment of the present invention.

FIG. 7 may be used in understanding how embodiments of the invention operate in practice and is applicable to the various types of network interconnectivity described above. Although the figure illustrates a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

Initially a control program is run on the client (stage 702). This control program may be launched by user initiated action or by automatic processing, such as by a start-up script. The control program may be configured to operate as a background process. The control program launches the client assistant (stage 704). In some embodiments, the control program waits for an Internet trigger (stage 706) before proceeding further. The Internet trigger may be the establishment of a connection between the client assistant and an associated server to which certain Internet traffic will be routed. In some embodiments, the control program does not wait for an Internet trigger.

Next, the control program reads the current (i.e., original) proxy settings for a browser application (stage 708). The control program reads the original proxy settings by any number of ways according to various embodiments, such as: (1) reading a set of entries in a registry of the client computer's registry; (2) calling an operating system provided function that provides the information; or (3) using a browser-specific function that provides the information.

The existing proxy settings, sometimes herein called the original proxy settings, are stored by the control program (stage 710) both for determining a set of modified proxy settings and for returning the proxy settings to the original proxy settings at an appropriate time, as explained below. In some embodiments, the original proxy settings are stored in a private area of the client computer's system registry. Using the original proxy settings, the control program determines and creates the modified proxy settings (stage 712). One embodiment of stage 712 is described more fully in connection with FIG. 8 below. The new proxy settings are then stored in the system registry and indicated to the browser for its use (stage 714). In one embodiment, the control program does this by creating a proxy auto-config (PAC) file that contains Javascript commands which are read by the browser as part of its processing of a URL request. The browser may be made aware of the new PAC file in any of a number of ways, including writing a reference into the system registry pointing to the new PAC file. In other embodiments, other mechanisms may be used to indicate the modified proxy settings to the browser, including: (1) writing the proxy settings to the system registry or a configuration file; (2) calling an operating system provided function that sets the information and indicates the new settings to the browser; (3) using a browser-specific library that does the same; or (4) using a browser-specific communication mechanism to indicate the new settings to the browser. In some embodiments, the new proxy settings are implemented as an executable program having machine code instructions native to the client computer.

After establishing the modified proxy settings, the control program monitors the network connectivity of the client computer. If the network connectivity changes or if the client assistant becomes disconnected from the server (stage 718), the control program restores the original proxy settings (stage 719) and then returns to stage 706. The control program also determines if itself should be terminated (stage 720). For instance, the control program should be terminated if the client computer is performing a shut down or restart sequence, or if the user requests that the control program terminate. When the control program determines that it should be terminated, the control program restores the original proxy settings (stage 722) and the client assistant is terminated (stage 724). Finally, the control program itself terminates (stage 726).

Figure 8:
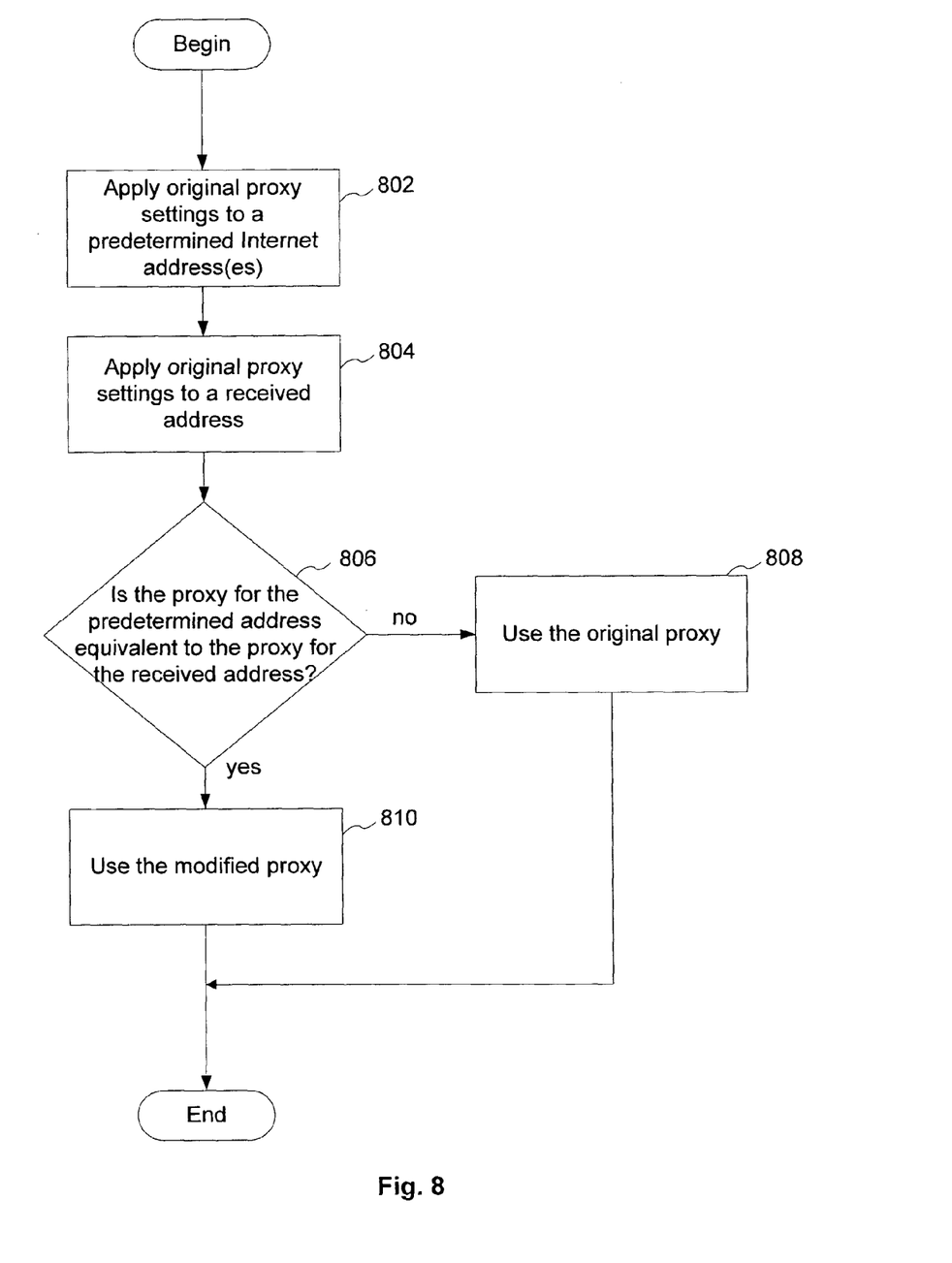
FIG. 8 illustrates logic associated with determining a proxy setting according to an embodiment of the invention.

Before discussing how the modified proxy settings are created (stage 712 of FIG. 7), it is helpful to understand the logic behind the new proxy settings which takes into account the previously described connectivity environments with reference to FIG. 8. As an initial condition, it is desirable to identify the original proxy settings for public Internet addresses. Accordingly, one or more, known, public Internet addresses are tested against the original proxy settings (stage 802). One example of a public Internet address might be www.google.com and another might be the address of the server used in conjunction with the client assistant. If the public Internet address results in a no-proxy value, then there is a high likelihood that public Internet addresses are not routed through a proxy according to the original settings. Conversely, if the result identifies a proxy, then there is a high likelihood that the original proxy settings route all public Internet traffic through that proxy. Other addresses could also be used to probe the original proxy configuration.

In this discussion, proxy settings are assumed to be a computer program or script that produces a result when presented with a URL as an input. The settings could be, for example, stored in a local file or accessible via a URL. When the result is "no proxy", this means that a request to download a document at the URL would be sent directly to its host, without being sent to a proxy. Thus, the "no proxy" result is sometimes called "direct".

At stage 804, a received URL (e.g., a URL specified by a user or by an application program) is run against the original proxy settings. This result is compared against the original proxy result for the public Internet address (stage 806). If the two proxy results are not equivalent (stage 806—no), then the received URL is routed through the proxy designated by the original proxy settings (stage 808). Thus, addresses that were routed through a proxy under the original proxy settings continue to be routed through the same proxy. If the two results are equivalent (stage 806—yes), then a modified proxy setting is used (stage 810). Here, the modified proxy setting is configured to be the client assistant. As described earlier, the client assistant in effect becomes a local proxy on the client.

To see the effects of these stages, it is instructive to examine how the logic would operate in the earlier described connectivity environments with particular reference to FIGS. 3-6. Referring to FIG. 3, as the browser uses the modified settings, it would run the received URL against the original proxy settings. If the received URL was in the private network 106, then the proxy result under the original settings (i.e., the proxy 206) would not match the proxy for the public Internet address under the original settings (i.e., no proxy). Accordingly, and referring to stages 806—no and 808 of FIG. 8, the browser would use the original proxy setting for the received URL and it would forward the request to the proxy 206, achieving the desired result. On the other hand, if the received URL is located on the Internet 104, the proxy result from the original proxy settings (i.e., no proxy) would match the proxy result from the original proxy settings for the public Internet address (i.e., no proxy) and so, referring to stages 806—yes and 810 of FIG. 8, the request is now directed to the client assistant 208, achieving the desired result. Thus, the modification of the proxy settings has not altered the traffic addressed to the private network 106.

Referring to FIG. 4, if the received address was in the private network 106, then the proxy under the original settings (i.e., direct) would not match the proxy for the public Internet address under the original proxy settings (i.e., the proxy 406). Accordingly, and referring to stages 806—no and 808 of FIG. 8, the browser would use the original proxy setting for the URL and it would direct the request directly to the private network 106, achieving the desired result. On the other hand, if the received address was located on the Internet 104, the proxy result from the original proxy settings (i.e., the proxy 214) would match the proxy result from the original proxy settings for the public Internet address (i.e., the proxy 214) and so, referring to stages 806—no and 810 of FIG. 8, the request is now directed to the client assistant 208, achieving the desired result. The client assistant 208 would send its traffic to the proxy 214. Since the client assistant 208 sets the IP address of its requests to server 210, the requests go to the server 210 from proxy 214 and not along connection 412 to the Internet 104. Thus, the modification of the proxy settings has not altered the traffic addressed to the private network 106 or bypassed the proxy 214.

Referring to FIG. 5, if the received address or URL was directed to one of the specialized proxies 502, then the proxy result under the original settings (i.e., one of the proxies 502) would not match the proxy result for the public Internet address under the original proxy settings (i.e., direct). Accordingly, and referring to stages 806—no and 808 of FIG. 8, the browser would use the original proxy setting for the URL and it would direct the request to the specialized proxy 502, achieving the desired result. On the other hand, if the received URL was not mapped to a proxy 520 by the original proxy settings, the proxy result from the original proxy settings (i.e., direct) would match the proxy result from the original proxy settings for the public Internet address (i.e., direct) and so, referring to stages 806—yes and 810 of FIG. 8, the request is now directed to the client assistant 208, achieving the desired result. Thus, the modification of the proxy settings has not altered the traffic addressed to the proxies 502.

Referring to FIG. 6, for all received addresses or URLs, the proxy under the original proxy settings (i.e., proxy 214) would match the proxy for the public Internet address under the original proxy settings (i.e., the proxy 214). Accordingly, and referring to stages 806—yes and 810 of FIG. 8, the browser would apply the modified proxy settings to the received URL and it would direct the request to client assistant 208. The client assistant 208 would send its traffic through the proxy 214, achieving the desired result. Since the client assistant 208 sets the IP address of its requests to server 210, the requests go to the server 210 from proxy 214 and not along connection 610 to the Internet 104. Thus, the modification of the proxy settings has not bypassed the proxy 214.

Figure 9:
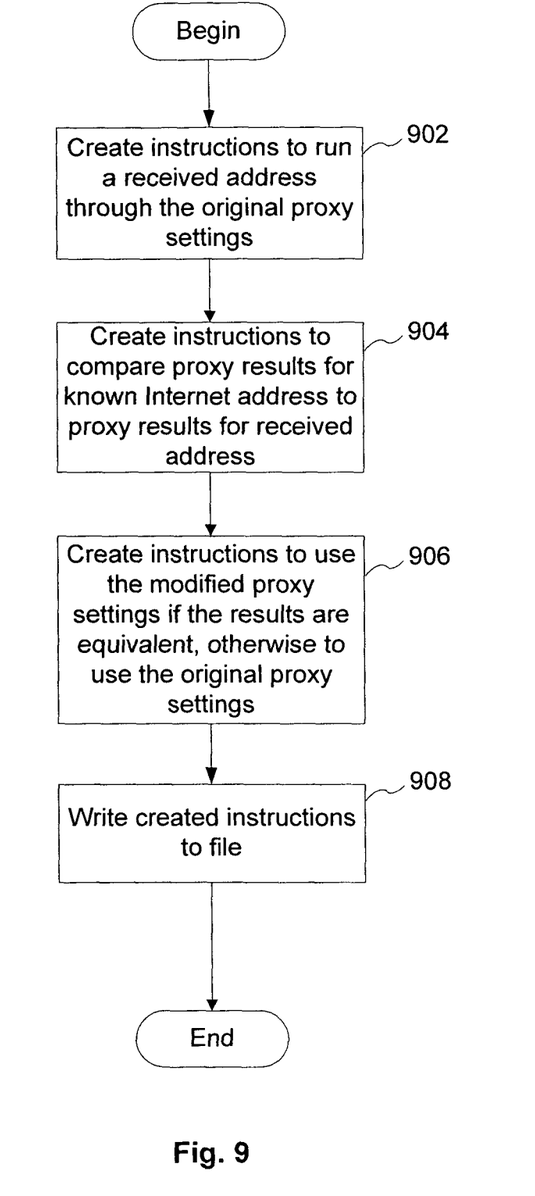
FIG. 9 illustrates a flowchart for creating instructions that create modified proxy settings.

FIG. 9 illustrates in more detail how the control program determines and creates the modified proxy settings (stage 712 of FIG. 7) according to an embodiment of the invention. The control program first creates instructions to determine what result the original proxy settings would have produced for a received address (stage 902). The control program then creates instructions to compare the proxy results that the public Internet address would have generated under the previous proxy settings against the proxy results of the desired address (stage 904). The control program then creates instructions that instruct the browser to use the modified proxy result for the received address if the earlier comparison of the two proxy results determined equivalence, and if the comparison did not, to use the original proxy result (stage 906). Finally, the control program writes the created instructions to a file or equivalent computer program object that may be executed or run by or in conjunction with the browser, such as a locally stored file or URL resource made available via HTTP (908). In other embodiments, other methodologies may be used to generate a computer program or object for implementing the modified proxy settings.

Although embodiments of the invention have been described in relation to a public Internet, those of ordinary skill in the art would recognize that the same techniques could be used when the Internet is replaced with other types of networks, where an address or ranges of address within that network may be known.

Figure 10:
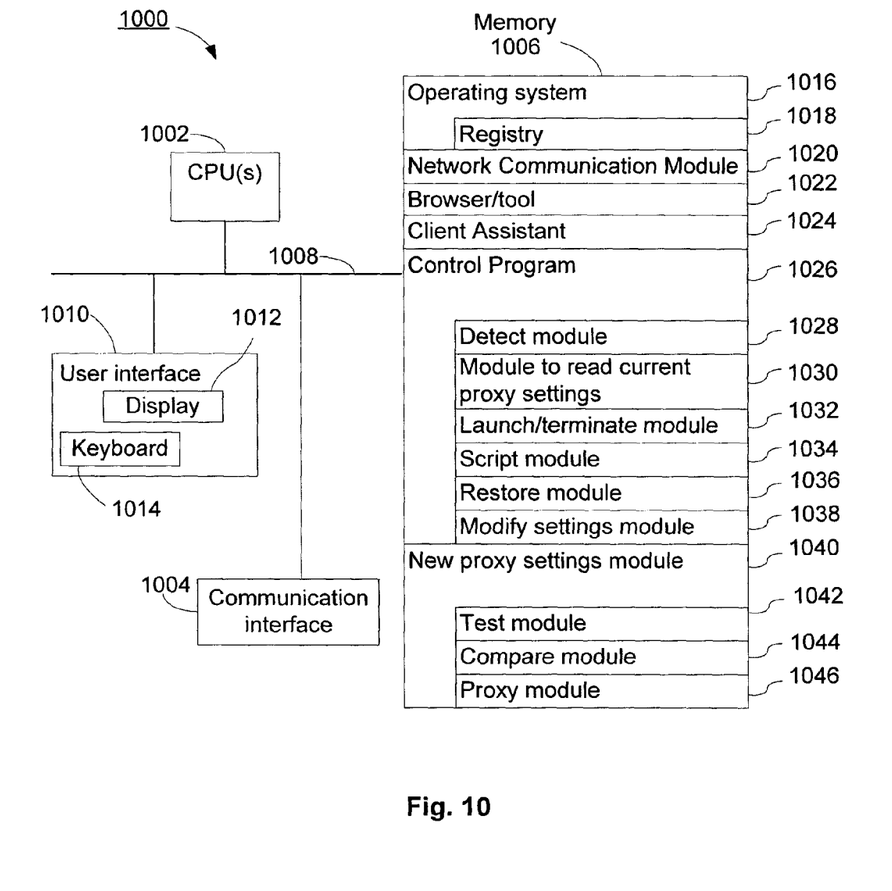
FIG. 10 is a block diagram of a system according to an embodiment of the invention.

Referring to FIG. 10, an embodiment of a system 1000 that implements the methods and logic described above includes one or more processing units (CPU's) 1002, one or more network or other communications interfaces 1004, memory 1006, and one or more communication buses 1008 for interconnecting these components. The system 1000 may optionally include a user interface 1010 comprising a display device 1012 and/or a keyboard 1014. Memory 1006 may include high speed random access memory and may also include non-volatile memory, such as one or more magnetic or optical storage disks. Memory 1006 may include mass storage that is remotely located from CPU's 1002. The memory 1006 may store:

- an operating system 1016 that includes procedures for handling various basic system services and for performing hardware dependent tasks, including a registry 1018 for storing certain information which may be used by various applications running on the client;
- a network communication module (or instructions) 1020 that is used for connecting the system 1000 to other computers via the one or more communications network interfaces 1004 (wired or wireless) and one or more communications networks, such as the Internet, other wide area networks, local area networks, metropolitan area networks, and so on;
- a browser/tool 1022 for interfacing with a user to receive user commands, including user selected or specified addresses, and for displaying documents corresponding to user selected or specified addresses (e.g., URLs);
- a client assistant 1024 that works in conjunction with a server and/or server application to provide benefits to a user when they are used in combination;
- a control program 1026 that is used to run the client assistant 1024 and create modified proxy settings, including a detect module 1028 for monitoring certain internet connections, a module to read current proxy settings 1030, a module to launch and terminate the client assistant 1032, a module 1034 for generating a new proxy settings module 1040, a restore module 1036 for restoring previous proxy settings, and a modify setting module 1038 for indicating to the browser new proxy settings; and
- a new proxy settings module 1040 containing modified proxy settings for a browser/tool 1022, including a test module or instructions for testing addresses against the original proxy settings 1042, a compare module or instructions 1044 for comparing the proxy results from the tested addresses, and a proxy module 1046 that directs the browser to a particular connection, e.g., a connection to a proxy or a direct connection.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for modifying proxy settings for a browser on a client system, comprising:
    on the client system,
        obtaining current proxy settings for the browser on the client system for first and second sets of internet protocol addresses, the second set of internet addresses including a range of internet protocol addresses; and
        replacing the proxy settings for the first set of internet protocol addresses, while leaving the proxy settings for the second set of internet protocols addresses unchanged.

2. The method of claim 1, wherein addresses in the second set of internet protocol addresses are within a private network to which access is limited and the first set of internet protocol addresses are not within the private network.

3. The method of claim 1, wherein the current proxy settings for the first set of internet protocol addresses indicates a direct connection and the current proxy settings for the second set of internet protocols addresses indicates connection to at least one predetermined proxy;

the method including replacing the proxy settings for the first set of internet protocol addresses with replacement proxy settings that direct access requests in the first set of internet protocol addresses to a predefined proxy.

4. A computer-implemented method for modifying proxy settings for a browser on a client system, comprising:

on the client system, launching a client assistant;

identifying existing proxy settings for the browser on the client system for a first set of internet protocol addresses and for a second set of internet protocol addresses;

determining modified proxy settings for the browser, wherein the modified proxy settings cause the browser to recognize the client assistant as a local proxy for communicating only with the first set of internet protocol addresses; and indicating to the browser the modified proxy settings.

5. The method of claim 4, further comprising: waiting for a predetermined connection status prior to identifying the existing proxy settings.

6. The method of claim 5, wherein the waiting for predetermined connection status includes waiting for a connection between the client assistant and a server, wherein the server is in communication with the first set of internet protocol addresses.

7. The method of claim 4, wherein the determining modified proxy settings includes creating a computer program object that:

returns a predetermined proxy as a proxy if a first proxy, for a predetermined internet address, determined according to the existing proxy settings is equivalent to a second proxy, for a desired internet address, determined according to the existing proxy settings, otherwise returning the second proxy as the proxy.

8. The method of claim 4, further comprising restoring the existing proxy settings upon a predetermined event.

9. The method of claim 4, wherein addresses in the second set of internet protocol addresses are within a private network to which access is limited, and addresses in the first set of internet protocol addresses are not within the private network.

* * * * *

UNITED STATES PATENT AND TRADEMARK OFFICE
CERTIFICATE OF CORRECTION

PATENT NO. : 8,676,922 B1  Page 1 of 1
APPLICATION NO. : 10/882791
DATED : March 18, 2014
INVENTOR(S) : Marius Milner It is certified that error appears in the above-identified patent and that said Letters Patent is hereby corrected as shown below:

In the Claims:

Claim 3, col. 11, line 8, please delete "protocols" and insert --protocol--

Signed and Sealed this
Tenth Day of June, 2014

Michelle K. Lee
*Deputy Director of the United States Patent and Trademark Office*